United States Patent
Wang et al.

(10) Patent No.: US 11,144,370 B2
(45) Date of Patent: Oct. 12, 2021

(54) COMMUNICATION METHOD FOR VIRTUAL MACHINES, ELECTRONIC DEVICE, AND NON-TRANSITORY COMPUTER READABLE STORAGE MEDIUM

(71) Applicant: Realtek Semiconductor Corporation, Hsinchu (TW)

(72) Inventors: Wei-Chuan Wang, Zhubei (TW); Po-Kai Chuang, Hsinchu (TW); Yu-Ting Ting, Hsinchu (TW); Chien-Kai Tseng, Changhua (TW); Tse Ho Lin, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 109 days.

(21) Appl. No.: 16/545,083

(22) Filed: Aug. 20, 2019

(65) Prior Publication Data
US 2020/0218562 A1 Jul. 9, 2020

(30) Foreign Application Priority Data
Jan. 7, 2019 (TW) .............. TW108100579

(51) Int. Cl.
*G06F 9/54* (2006.01)
*G06F 9/455* (2018.01)
(Continued)

(52) U.S. Cl.
CPC ............ *G06F 9/54* (2013.01); *G06F 9/45558* (2013.01); *G06F 9/4812* (2013.01);
(Continued)

(58) Field of Classification Search
CPC .. G06F 9/45558; G06F 9/4812; G06F 9/5088; G06F 9/547; G06F 2009/4557; G06F 2009/45595
See application file for complete search history.

(56) References Cited

U.S. PATENT DOCUMENTS 9,276,953 B2 * 3/2016 Abidi .................... H04L 49/00
2007/0288921 A1 12/2007 King et al.
(Continued)

FOREIGN PATENT DOCUMENTS

CN 102467637 A 5/2012
CN 105162667 A 12/2015
(Continued)

*Primary Examiner* — Jacob D Dascomb
(74) *Attorney, Agent, or Firm* — Locke Lord LLP; Tim Tingkang Xia, Esq.

(57) ABSTRACT

The present disclosure provides a communication method for virtual machines, an electronic device, and a non-transitory computer readable storage medium. The communication method for virtual machines suitable for a virtual machine architecture comprises the steps of: transmitting, through a shared link, an interrupt instruction to a second virtual machine by a first virtual machine; reading, in a shared configuration database, an instruction data corresponding to the interrupt instruction by the second virtual machine; and executing the instruction data and transmitting a result data through a virtual control plane to the first virtual machine by the second virtual machine, to exchange the data between the first virtual machine and the second virtual machine through the virtual control plane.

18 Claims, 5 Drawing Sheets

(51) Int. Cl.
*G06F 9/50* (2006.01)
*G06F 9/48* (2006.01)

(52) U.S. Cl.
CPC ............ *G06F 9/5088* (2013.01); *G06F 9/547* (2013.01); *G06F 2009/4557* (2013.01); *G06F 2009/45595* (2013.01)

(56) References Cited

U.S. PATENT DOCUMENTS

| | | | |
|---|---|---|---|
| 2015/0249712 A1* | 9/2015 | Biondi | H04L 45/50 709/227 |
| 2016/0218929 A1 | 7/2016 | Bhuyan | |
| 2018/0349162 A1 | 12/2018 | Tian et al. | |
| 2019/0340657 A1* | 11/2019 | Ashner | H04L 69/321 |

FOREIGN PATENT DOCUMENTS

| KR | 20130107298 A | 10/2013 |
|---|---|---|
| KR | 101387971 B1 | 4/2014 |

\* cited by examiner

COMMUNICATION METHOD FOR VIRTUAL MACHINES, ELECTRONIC DEVICE, AND NON-TRANSITORY COMPUTER READABLE STORAGE MEDIUM

CROSS-REFERENCE TO RELATED APPLICATION

This application claims priority to Taiwan Application Serial Number 108100579, filed on Jan. 7, 2019, which is herein incorporated by reference.

BACKGROUND

Technical Field

The disclosure relates to a method for virtual machines and an electronic device. More particularly, the disclosure relates to a communication method for virtual machines and an electronic device.

Description of Related Art

In the integrated electronic device with the home gateway (HGW) and the basic network service unit (over-the-top, OTT), when the electronic device turns on, a plurality of virtual machines configured on the electronic device will be turned on. However, there is lack of synchronization mechanism between virtual machines and there is no efficient way to manage the virtual machines. Further, the known way cannot provide an efficient method for managing internet protocol addresses of the OTT, such that it is more difficult for establishing the connection between the electronic device and OTT.

SUMMARY

Some aspects of the present disclosure are to provide a communication method for virtual machines suitable for a virtual machine architecture, and the method comprises: transmitting, through a shared link, an interrupt instruction to a second virtual machine by a first virtual machine; reading, in a shared configuration database, an instruction data corresponding to the interrupt instruction by the second virtual machine; and executing the instruction data and transmitting a result data through a virtual control plane to the first virtual machine by the second virtual machine, to exchange the data between the first virtual machine and the second virtual machine through the virtual control plane.

Some aspects of the present disclosure are to provide an electronic device, and the electronic device comprises: a storage media configured to store a plurality of program instructions; and a processor coupled to the storage media, and the processor is configured to execute the program instructions to perform operations of a first virtual machine and a second virtual machine in a virtual machine architecture, wherein the operations performed by the processor comprising: transmitting, through a shared link, an interrupt instruction to a second virtual machine by a first virtual machine; reading, in a shared configuration database, an instruction data corresponding to the interrupt instruction by the second virtual machine; and executing the instruction data and transmitting a result data through a virtual control plane to the first virtual machine by the second virtual machine, to exchange the data between the first virtual machine and the second virtual machine through the virtual control plane.

Some aspects of the present disclosure are to provide a non-transitory computer readable storage medium comprising instructions stored thereon, when the instructions loaded to a processor, the processor executes the instructions to operate a virtual machine architecture and perform the steps of: transmitting, through a shared link, an interrupt instruction to a second virtual machine by a first virtual machine; reading, in a shared configuration database, an instruction data corresponding to the interrupt instruction by the second virtual machine; and executing the instruction data and transmitting a result data through a virtual control plane to the first virtual machine by the second virtual machine, to exchange the data between the first virtual machine and the second virtual machine through the virtual control plane.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
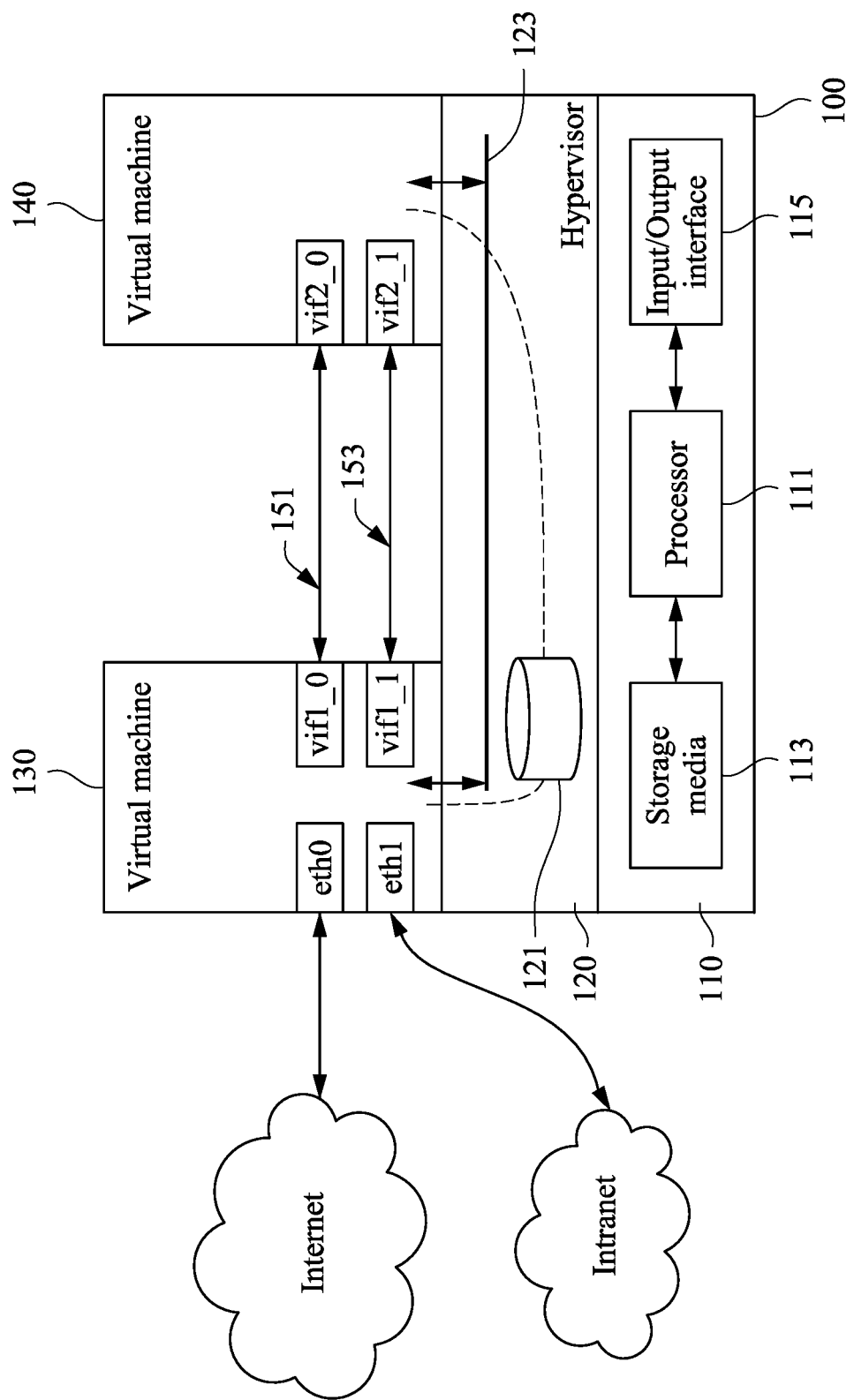
FIG. 1 is a schematic diagram illustrating an electronic device operating virtual machines in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Please refer to FIG. 1. FIG. 1 is a schematic diagram illustrating an electronic device 100 operating virtual machines in accordance with some embodiments of the present disclosure. As shown in FIG. 1, the electronic device 100 includes hardware 110. The hardware 110 includes a processor 111, a storage media 113, and an input/output interface 115. In one embodiment, a virtual machine architecture is disposed on the electronic device 100, the virtual machine architecture is, for example, the Xen architecture. Therefore, the electronic device 100 could deploy a virtual machine 130 and a virtual machine 140.

The virtual machine 130 includes a physical network interface eth0 and a physical network interface eth1. The physical network interface eth0 and the physical network interface eth1 could be actual-deployed physical network interface at the electronic device 100. The virtual machine 130 includes a virtual network interface vif1_0 and a virtual network interface vif1_1. The virtual machine 140 includes a virtual network interface vif2_0 and a virtual network interface vif2_1.

A virtual data plane 151 is created between the virtual network interface vif1_0 and the virtual network interface vif2_0. In one embodiment, the virtual machine 130 receives stream data through the physical network interface eth0 and/or the physical network interface eth1, and the stream data is transmitted to the virtual machine 140 through the virtual data plane 151, so that the virtual machine 140 could plays the stream data.

A virtual control plane 153 is created between the virtual network interface vif1_1 and the virtual network interface vif2_1. In one embodiment, the virtual network interface vif1_1 and the virtual network interface vif2_1 are configured different and fixed internet protocol addresses (IP address) and media access control addresses (MAC Address), which the virtual control plane 153 is dedicated to transmitting control data except the stream data (such as multimedia stream data). It should be noted that the number of virtual machines in the virtual machine architecture is not limited and the number of virtual network interfaces at each virtual machine is also not limited. Further, each virtual machine could have at least one virtual network interface to establish the virtual control plane. Settings of the virtual network interface associated with the virtual control plane could not be modified by users. Status of the virtual network interface is not allowed for users to check. In one embodiment, the virtual network interface of the virtual control plane is configured by operating system (virtual machine operating system) of the virtual machine architecture, for example, the internet protocol address, the media access control address, and so on.

As shown in FIG. 1, a hypervisor 120 is configured to manage operations for virtual machines of the electronic device 110. The hypervisor 120 includes a shared configuration database 121 (such as XenStore). The shared configuration database 121 is configured to store identifiers and/or a plurality of commands (each command is, for example, a 32-byte string).

The processor 111 randomly generates identifiers of the virtual machine 130 and the virtual machine 140 respectively in response to initiating the virtual machine 130 and the virtual machine 140 at the electronic device 100, and the processor 111 stores the identifiers at the shared configuration database 121. In one embodiment, the packet transmitted through the virtual control plane 152 by virtual machine 130 includes the identifier. Because the unknown identifier of the packet is unrecognizable to the virtual machine 140, the virtual machine 140 looks the unknown identifier up in the shared configuration database 121. When the shared configuration database 121 includes the identifier corresponding to the unknown identifier, the procedure to verify the virtual machine 130 is completed.

Before the virtual machine 130 transmits the interrupt instruction, the command strings corresponding to the interrupt instruction could be written into the shared configuration database 121. The virtual machine 130 transmits the interrupt instruction through a shared link 123 (such as XenBus) to the virtual machine 140 to prompt the virtual machine 140 to access the shared configuration database 121, and vice versa. In one embodiment, the shared configuration database 121 stores the command strings each with fixed storage location and space (such as 32-byte), therefore the virtual machine 130 and the virtual machine 140 could directly read the instruction data in response to receiving the interrupt instruction.

Figure 2:
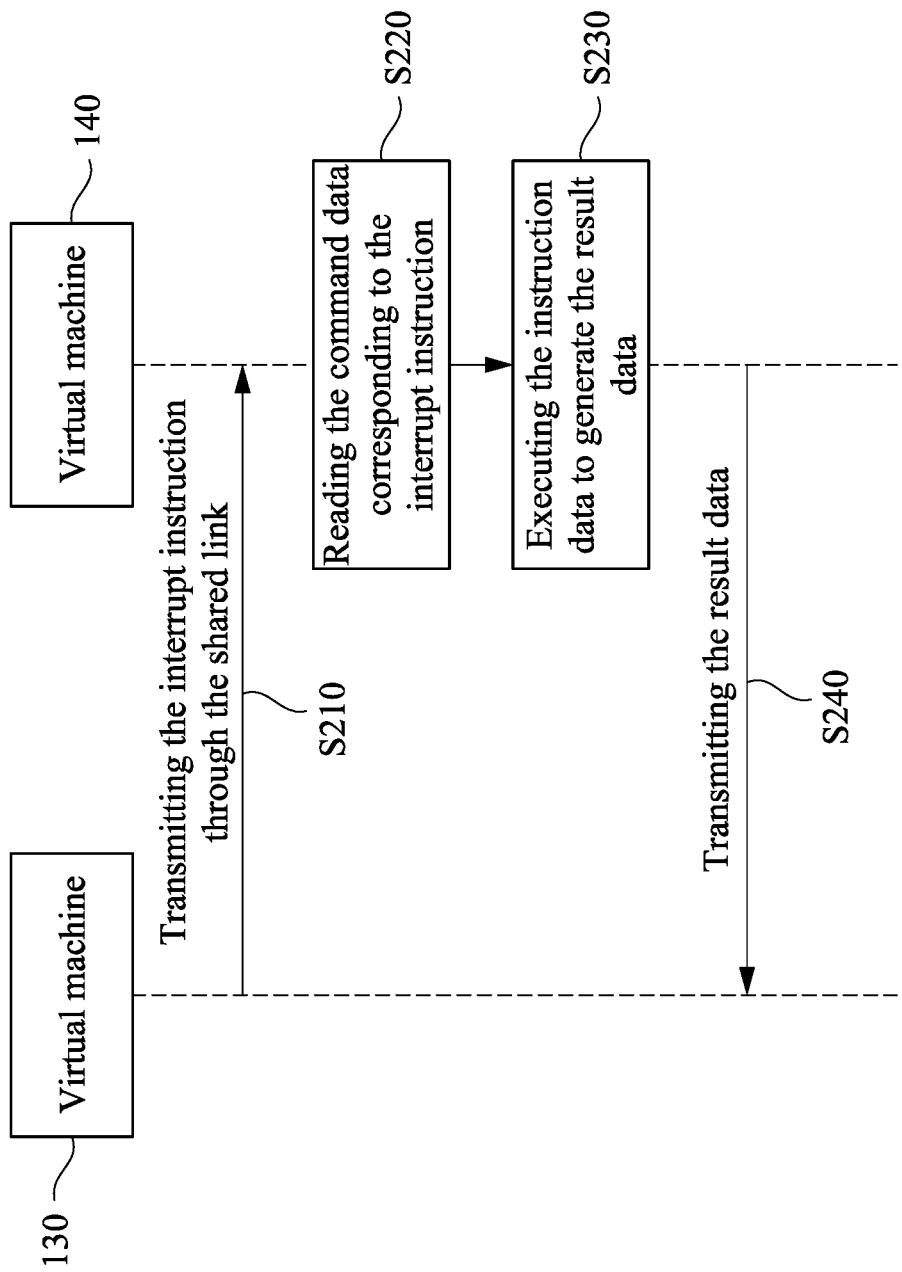
FIG. 2 is a flow diagram illustrating a communication method for virtual machines in accordance with some embodiments of the present disclosure.

Please refer to FIG. 2. FIG. 2 is a flow diagram illustrating a communication method for virtual machines in accordance with some embodiments of the present disclosure. As shown in FIG. 1 and FIG. 2, in step S210, the virtual machine 130 transmits the interrupt instruction through the shared link 123 to the virtual machine 140. In one embodiment, any feedback or result acknowledged by the virtual machine 140 is not essential for the virtual machine 130 in response to the virtual machine 130 transmitting the interrupt instruction, and virtual machine 130 could continue other operations their own. In step S220, the virtual machine 140 reads the command string corresponding to the interrupt instruction in the shared configuration database 121. In step S230, the virtual machine 140 executes the instruction data to generate the result data. In one embodiment, the virtual machine 140 stores a script, the script includes instructions that indicate to retransmit the result data. In step S240, the virtual machine 140 transmits the result data through the virtual control plane 153 to the virtual machine 130 according to instructions of the script.

Figure 3:
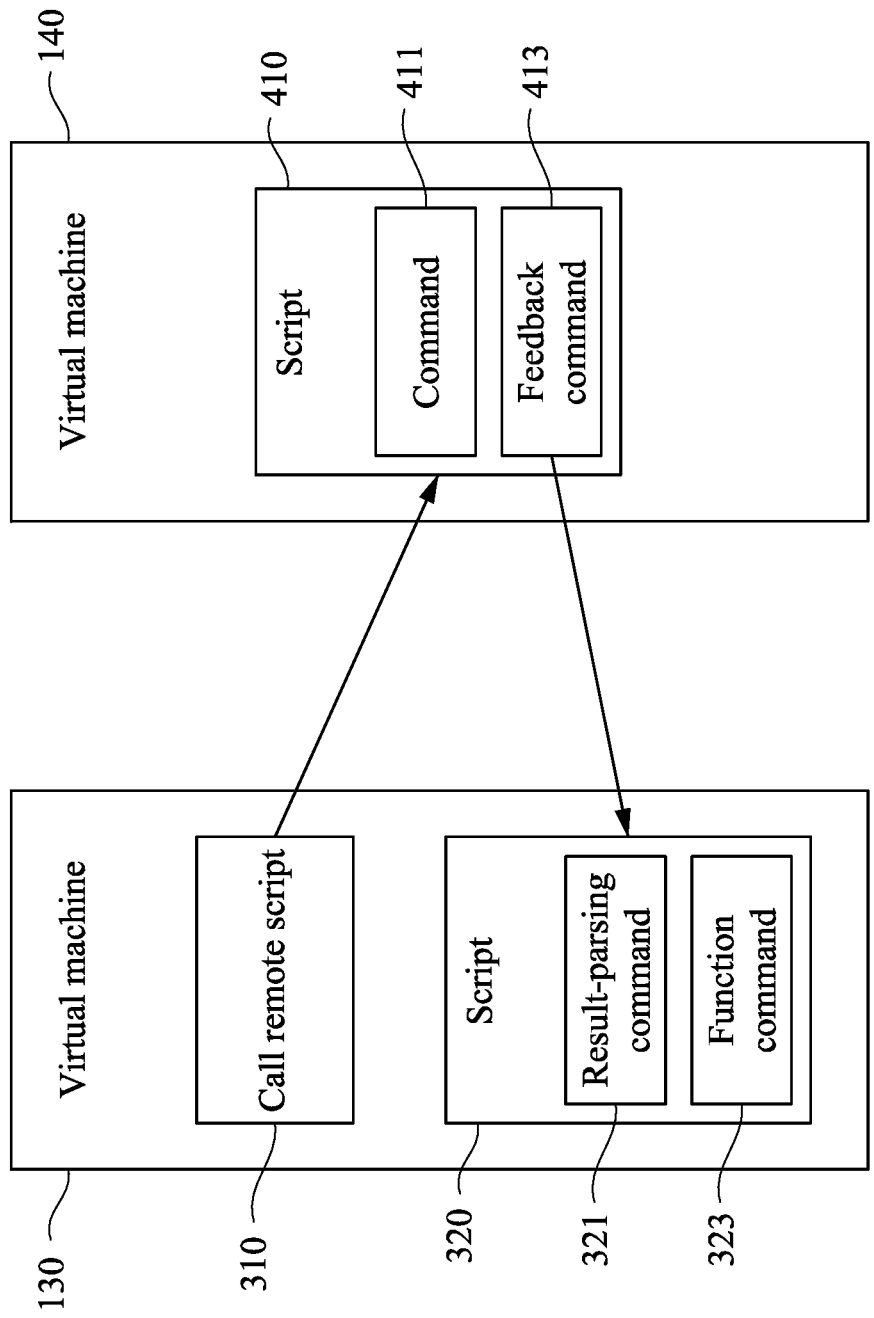
FIG. 3 is a flow diagram illustrating a procedure of calling remote scripts by virtual machines in accordance with some embodiments of the disclosure.

Please refer to FIG. 3. FIG. 3 is a flow diagram illustrating a procedure of calling remote scripts by virtual machines in accordance with some embodiments of the disclosure. The virtual machine 130 and the virtual machine 140 execute their own tasks according to the scripts stored thereon. As shown in FIG. 3, the virtual machine 130 stores a call remote script 310 and a script 320. The script 320 includes a result-parsing command 321 and a function command 323. The virtual machine 140 stores a script 410. The script 410 includes a command 411 and a feedback command 413. In one embodiment, the virtual machine 130 executes the call remote script 310, for example, commands of reconfiguring the internet status of the virtual machine 140 (in one embodiment, the dynamic host configuration protocol redistributes the internet protocol addresses), after the virtual machine 130 receives trigger events (such as events of reconnecting the Internet). Then, the interrupt instruction (such as step S210 of FIG. 2) is transmitted to the virtual machine 140 through the shared link. The virtual machine 140 executes the script 410 according to the instruction data (such as the step S220 in FIG. 2).

In one embodiment, the last line of the script 410 includes a feedback command 413. When the virtual machine 140 executes the feedback command 413, the virtual machine 140 transmits the result data through the virtual control plane to the virtual machine 130, and make the virtual machine 130 execute the script 320 based on the interrupt instruction. The virtual machine 130 executes the result-parsing command 321 of the script 320, in order to determine whether the result data is normal or not. In one embodiment, if the virtual machine 130 determines that network status of the virtual machine 140 is abnormal (for example, the virtual data plane 151 is disconnected in FIG. 1 or the virtual network interface vif2_0 is not allocated any IP address), the virtual machine 130 executes the function command 323 to recover the internet connection between the virtual machine 130 and the virtual machine 140.

Therefore, the synchronizing communication between virtual machines is provided that the transmitter requesting data does not have to spend time waiting for feedback of the receiver, and the waiting time is eliminated and the resource usage of the shared link 123 is more efficient.

It should be noted that, in other embodiments, in FIG. 3, the virtual machine 130 (the caller) and the virtual machine 140 (the callee) could be exchanged with each other, and it is not limited on the caller-callee relation like the virtual machine 130 and the virtual machine 140.

Figure 4:
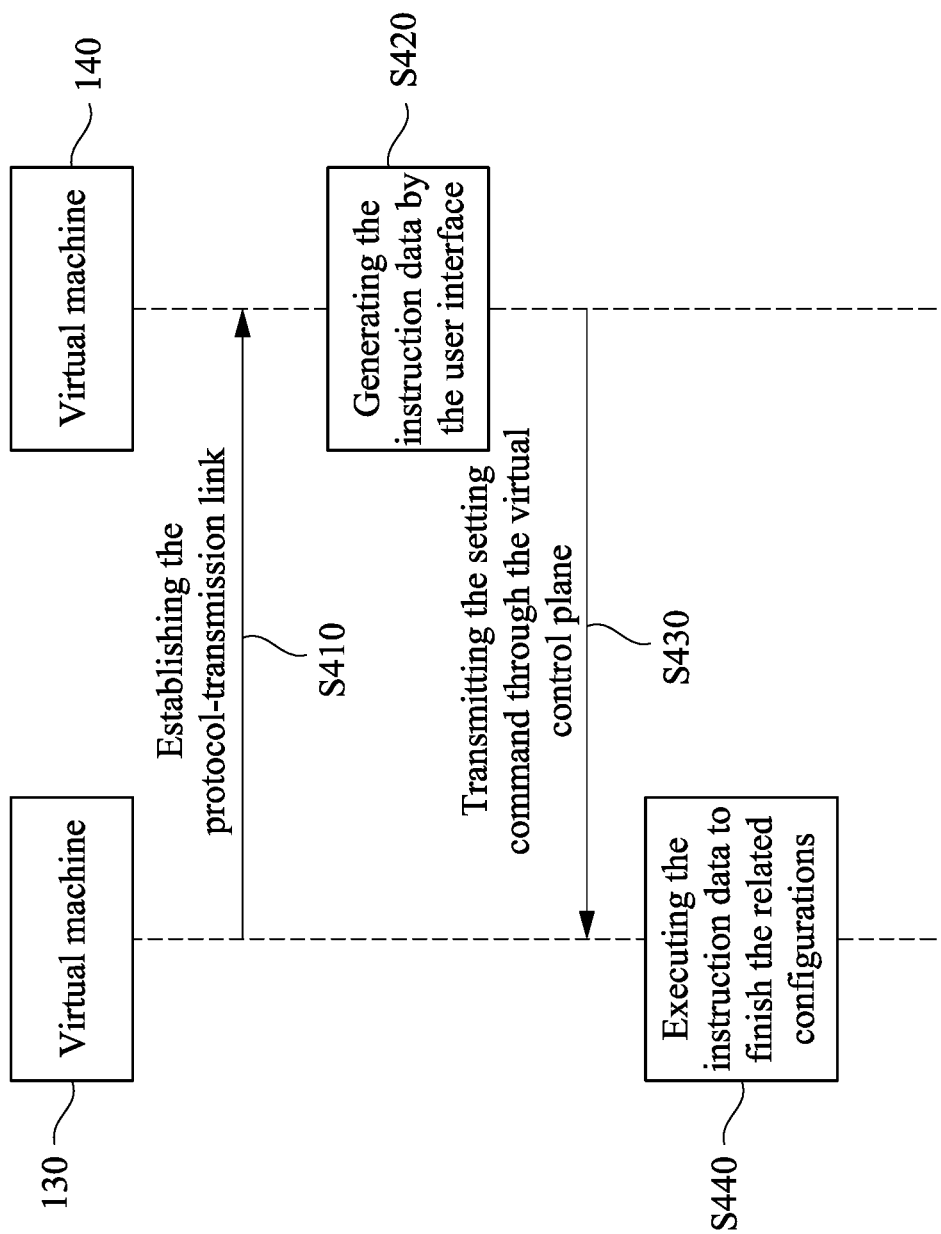
FIG. 4 is a flow diagram illustrating the communication method for virtual machines in accordance with some embodiments of the present disclosure.

Please refer to FIG. 4. FIG. 4 is a flow diagram illustrating the communication method for virtual machines in accordance with some embodiments of the present disclosure. As shown in FIG. 4, in step S410, a protocol-transmission link, by the virtual control plane 153, is established between the virtual machine 130 and the virtual machine 140. The protocol-transmission link is, for example, TCP/UDP connection. In step S420, a user interface of the virtual machine 140 generates the instruction data, such as the setting command to the virtual machine 130. In step S430, the setting command is transmitted through the virtual control plane to the virtual machine 130. In step S440, the virtual machine 130 calls the corresponded command of the script according to the setting command to finish related configurations.

Figure 5:
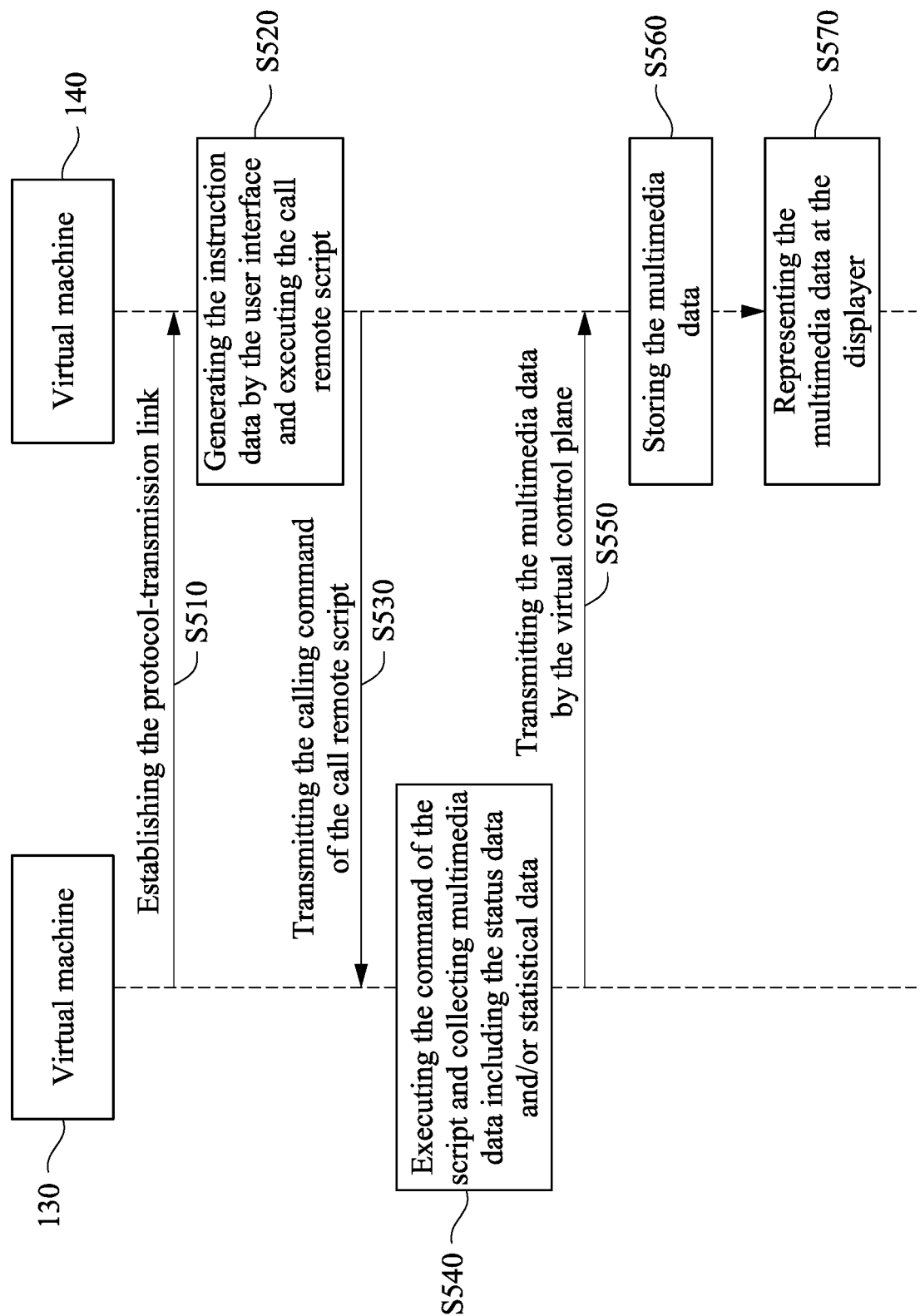
FIG. 5 is a flow diagram illustrating the communication method for virtual machines in accordance with some embodiments of the disclosure.

Please refer to FIG. 5. FIG. 5 is a flow diagram illustrating the communication method for virtual machines in accordance with some embodiments of the disclosure. As shown in FIG. 5, in step S510, the protocol-transmission link, by the virtual control plane 153, is established between the virtual machine 130 and the virtual machine 140. In step S520, the user interface of the virtual machine 140 generates the instruction data, for example, the instructions for requiring network status. Further, the call remote script of the script stored in the virtual machine 140 is executed (please refer the calling remote procedure executed by the virtual machine 130 in FIG. 3 as mentioned previously).

In step S530, the calling command of the call remote script is transmitted to the virtual machine 130. In step S540, the virtual machine 130 accesses some indicated script stored in the virtual machine 130 according to the calling command. In one embodiment, the virtual machine 130 accesses the script used for collecting network status data, and the multimedia data about network-related status data and/or statistical data is retrieved. In step S550, the multimedia data is transmitted by the virtual control plane. The multimedia data can be but not limited to network status data, statistical data, statistic graphs, etc. In step S560, the virtual machine 140 stores the multimedia data. In step S570, a displayer of the virtual machine 140 shows or presents the multimedia data.

Because the related configurations of virtual control plane have been abandoned being altered by users directly, the network interface will not be shut down by users that the control data could not be transmitted.

In one embodiment, the aforementioned communication method could be implemented by computer programs which are stored in non-transitory computer readable storage medium, and computers or the electronic device could access the storage medium to execute the communication method for virtual machines.

In one embodiment, the electronic device 100 of FIG. 1 can be but not limited to multimedia set-top-box. The virtual machine 130 is configured to process network communication tasks (for example, the home gateway (HGW)), and the virtual machine 140 is configured to process multimedia stream tasks (for example, basic network service unit (over-the-top, OTT)). When the user does not watch the movie or television programs, the user can selectively turn off the virtual machine 140, so that the electronic device 100 could save electric power of the virtual machine 140. Meanwhile, because the virtual machine 130 is not turned off, the user can still operate the functions of network communication, for example, the communication link to the Internet or the Intranet through the electronic device 100.

As mentioned above, the communication method for virtual machines and the electronic device 100 of the present disclosure, when functions or operations worked between virtual machines are required to revise or expand, the hypervisor or the core program of the virtual machine architecture need not be altered, and the data exchanging among virtual machines can be provided by editing the script of the virtual machines. Therefore, the synchronization mechanism for exchanging data among virtual machines could implement without generating other new interrupt instructions.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication method for virtual machines suitable for a virtual machine architecture, wherein the method comprises:
   transmitting, through a shared link, an interrupt instruction to a second virtual machine by a first virtual machine;
   reading, in a shared configuration database, an instruction data corresponding to the interrupt instruction by the second virtual machine; and
   executing the instruction data and transmitting a result data through a virtual control plane to the first virtual machine by the second virtual machine, to exchange the data between the first virtual machine and the second virtual machine through the virtual control plane;
   wherein executing the instruction data by the second virtual machine further comprises:
   generating, by a user interface of the second virtual machine, a setting command of the instruction data;
   transmitting, through the virtual control plane, the setting command to the first virtual machine; and
   finishing, by the first virtual machine, a functional setting of the first virtual machine according to the setting command.

2. The method of claim 1, further comprising:
   transmitting the result data through the virtual control plane between a first virtual interface of the first virtual machine and a first virtual interface of the second virtual machine.

3. The method of claim 1, further comprising:
   transmitting, through a virtual data plane between a second virtual interface of the first virtual machine and a second virtual interface of the second virtual machine, a stream data to the second virtual machine, to play the stream data on a display connected with the second virtual machine.

4. The method of claim 1, further comprising:
   generating an identifier of the first virtual machine when initializing the first virtual machine, and storing the identifier in the shared configuration database.

5. The method of claim 4, further comprising:
   looking the unknown identifier up in the shared configuration database to verify the unknown identifier in response to receiving a packet comprising an unknown identifier by the second virtual machine; and
   finishing, by the second virtual machine, a verification procedure for the first virtual machine in response to the unknown identifier matching the identifier.

6. The method of claim 1, further comprising:
stopping, by the first virtual machine, waiting for a response of the second virtual machine in response to transmitting the interrupt instruction through the virtual control plane.

7. The method of claim 1, wherein the step of executing the instruction data by the second virtual machine further comprises:
calling, by the second virtual machine, a corresponding script of the instruction data, and executing the corresponding script to generate the result data; and
transmitting, through the virtual control plane, the result data to the first virtual machine.

8. The method of claim 1, further comprising:
transmitting a calling command of the call remote script to the first virtual machine in response to the instruction data read by the second virtual machine comprising a call remote script; and executing, by the first virtual machine, a corresponding script according to the calling command.

9. The method of claim 8, further comprising:
executing, by the first virtual machine, commands of the corresponding script to generate a multimedia data; and
transmitting, through the virtual control plane, the multimedia data to the second virtual machine according to a feedback command of the corresponding script, to display the multimedia data on a display of the second virtual machine.

10. An electronic device, comprising:
a storage media configured to store a plurality of program instructions; and
a processor coupled to the storage media, wherein the processor is configured to execute the program instructions to perform operations of a first virtual machine and a second virtual machine in a virtual machine architecture, wherein the operations performed by the processor comprising:
transmitting, through a shared link, an interrupt instruction to a second virtual machine by a first virtual machine;
reading, in a shared configuration database, an instruction data corresponding to the interrupt instruction by the second virtual machine; and
executing the instruction data and transmitting a result data through a virtual control plane to the first virtual machine by the second virtual machine, to exchange the data between the first virtual machine and the second virtual machine through the virtual control plane;
wherein a user interface of the second virtual machine generates a setting command of the instruction data, and transmits the setting command through the virtual control plane to the first virtual machine, and the first virtual machine finishes a functional setting of the first virtual machine according to the setting command.

11. The electronic device of claim 10, wherein the virtual control plane is established between a first virtual interface of the first virtual machine and a first virtual interface of the second virtual machine, wherein the virtual control plane is configured to transmit the result data.

12. The electronic device of claim 10, wherein a virtual data plane is established between a second virtual interface of the first virtual machine and a second virtual interface of the second virtual machine, wherein the first virtual machine transmits a stream data through the virtual data plane to the second virtual machine, so that a display connected with the second virtual machine plays the stream data.

13. The electronic device of claim 10, wherein an identifier of the first virtual machine is generated in response to the first virtual machine initialized, and the identifier is stored in the shared configuration database.

14. The electronic device of claim 13, wherein the shared configuration database is looked up to verify the unknown identifier in response to receiving a packet comprising an unknown identifier by the second virtual machine, and the second virtual machine finishes a verification procedure for the first virtual machine in response to determining that the unknown identifier matched the identifier.

15. The electronic device of claim 10, wherein the first virtual machine stops waiting for a response of the second virtual machine in response to the first virtual machine transmitting the interrupt instruction through the virtual control plane.

16. The electronic device of claim 10, wherein the second virtual machine calls a corresponding script of the instruction data to execute the corresponding script and generate the result data, and the second virtual machine transmits the result data through the virtual control plane to the first virtual machine.

17. The electronic device of claim 16, wherein a calling command of the call remote script is transmitted to the first virtual machine in response to the instruction data read by the second virtual machine comprising a call remote script, so that the first virtual machine executes a corresponding script according to the calling command; wherein the first virtual machine executes commands of the corresponding script to generate a multimedia data, and the first virtual machine transmits the multimedia data through the virtual control plane to the second virtual machine according to a feedback command of the corresponding script, and a display of the second virtual machine plays the multimedia data.

18. A non-transitory computer readable storage medium comprising instructions stored thereon, when the instructions loaded to a processor, the processor executes the instructions to operate a virtual machine architecture and to perform the steps of:
transmitting, through a shared link, an interrupt instruction to a second virtual machine by a first virtual machine;
reading, in a shared configuration database, an instruction data corresponding to the interrupt instruction by the second virtual machine; and
executing the instruction data and transmitting a result data through a virtual control plane to the first virtual machine by the second virtual machine, to exchange the data between the first virtual machine and the second virtual machine through the virtual control plane;
wherein a user interface of the second virtual machine generates a setting command of the instruction data, and transmits the setting command through the virtual control plane to the first virtual machine, and the first virtual machine finishes a functional setting of the first virtual machine according to the setting command.

* * * * *